United States Patent
Shimizu et al.

(10) Patent No.: US 7,234,553 B2
(45) Date of Patent: Jun. 26, 2007

(54) VEHICLE DRIVING FORCE CONTROL APPARATUS

(75) Inventors: Kouichi Shimizu, Sagamihara (JP); Keiji Kadota, Zama (JP); Keigo Nishio, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 163 days.

(21) Appl. No.: 10/637,521

(22) Filed: Aug. 11, 2003

(65) Prior Publication Data

US 2004/0040759 A1  Mar. 4, 2004

(30) Foreign Application Priority Data

Aug. 30, 2002  (JP) ............... 2002-255073

(51) Int. Cl.
*B60K 6/02* (2006.01)

(52) U.S. Cl. ............... 180/65.2; 180/197; 180/245

(58) Field of Classification Search ............... 180/197, 180/15, 233, 242, 243, 245, 65.2
See application file for complete search history.

(56) References Cited

U.S. PATENT DOCUMENTS

| | | | | |
|---|---|---|---|---|
| 4,923,025 | A | * | 5/1990 | Ellers .................. 180/65.2 |
| 5,346,031 | A | * | 9/1994 | Gardner ................ 180/179 |
| 5,495,906 | A | * | 3/1996 | Furutani ............... 180/65.2 |
| 5,839,535 | A | * | 11/1998 | Arai .................... 180/197 |
| 5,993,351 | A | | 11/1999 | Deguchi et al. |
| 6,059,064 | A | * | 5/2000 | Nagano et al. .......... 180/243 |
| 6,176,807 | B1 | | 1/2001 | Oba et al. |
| 6,205,379 | B1 | * | 3/2001 | Morisawa et al. ........... 701/22 |
| 6,434,469 | B1 | | 8/2002 | Shimizu et al. |
| 6,442,454 | B1 | | 8/2002 | Akiba et al. |
| 2003/0010559 | A1 | | 1/2003 | Suzuki |
| 2003/0064858 | A1 | | 4/2003 | Saeki et al. |
| 2003/0089539 | A1 | | 5/2003 | Kadota |
| 2003/0151381 | A1 | | 8/2003 | Kadota et al. |

FOREIGN PATENT DOCUMENTS

| | | |
|---|---|---|
| EP | 1000789 A2 | 5/2000 |
| EP | 1205331 A2 | 5/2002 |
| JP | 9-315164 A | 12/1997 |
| JP | 11-243608 A | 9/1999 |
| JP | 2000-261909 A | 9/2000 |

(Continued)

*Primary Examiner*—Christopher P. Ellis
*Assistant Examiner*—Brian Swenson
(74) *Attorney, Agent, or Firm*—Global IP Counselors, LLP

(57) ABSTRACT

A driving force control apparatus is provided to prevent shocks from being generated during clutch engagement or release. The clutch is maintained in an engaged state and shocks are prevented from accompanying clutch release during creep travel when the target motor torque is equal to or less than a motor torque prescribed value but the average rear wheel speed, which is equivalent to the travel speed of the auto vehicle, is equal to or less than a low-speed prescribed value. In addition, the drive torque on the rear wheels from the electric motor is also brought to the same level as the creep torque on the front wheels from the internal combustion engine, backlash and other types of gaps between the rear axles of the electric motor are closed, and shocks are minimized or prevented during the subsequent transition to a four-wheel drive state.

14 Claims, 10 Drawing Sheets

FOREIGN PATENT DOCUMENTS

| | | |
|---|---|---|
| JP | 2000-343963 A | 12/2000 |
| JP | 2001-138764 A | 5/2001 |
| JP | 2002-142310 A | 5/2002 |
| JP | 2002-200932 A | 7/2002 |
| JP | 2002-218605 A | 8/2002 |
| JP | 2003-025861 A | 1/2003 |
| JP | 2003-130200 A | 5/2003 |
| JP | 2003-156079 A | 5/2003 |
| JP | 2003-209902 A | 7/2003 |

* cited by examiner

US 7,234,553 B2

VEHICLE DRIVING FORCE CONTROL APPARATUS

BACKGROUND OF THE INVENTION

1. Field of the Invention

The present invention relates to a four-wheel-drive vehicle in which a four-wheel drive state can be maintained by driving the main drive wheels with an internal combustion engine or other main drive source, and driving the subordinate drive wheels with an electric motor in an appropriate manner, and is particularly suitable for the engagement control of a clutch disposed between the electric motor and the subordinate drive wheels.

2. Background Information

An example of a driving force control apparatus for a batteryless four-wheel drive vehicle is disclosed in Japanese Laid-Open Patent Application No. 11-243608. In the four-wheel-drive vehicle of this publication, the front wheels are driven by an internal combustion engine, and the rear wheels are driven by an electric motor during a four-wheel drive. The output torque of the electric motor is commonly transferred to the rear wheel axle via a clutch and a reduction gear. In this apparatus, the clutch is engaged after the rotational speed of the rear wheel axle and the rotational speed of the electric motor are synchronized in order to prevent shocks from being generated by the clutch engagement during the transition to the four-wheel drive state.

The clutch is commonly connected to make a transition to a four-wheel drive state, and the subordinate drive wheels are brought into the drive state when the accelerator pedal is depressed and it is detected that the speed differential between the front and rear wheels is at or above a prescribed level, i.e., that the main drive wheels are experiencing an acceleration slippage that is at or above a prescribed level.

In view of the above, it will be apparent to those skilled in the art from this disclosure that there exists a need for an improved vehicle driving force control apparatus. This invention addresses this need in the art as well as other needs, which will become apparent to those skilled in the art from this disclosure.

SUMMARY OF THE INVENTION

It has been discovered that in the above-described conventional driving force control apparatus, the clutch disposed between the electric motor and the subordinate drive wheels is merely engaged when a four-wheel drive state is required, so a two-wheel drive state is maintained, i.e., the clutch is not engaged, in all other travel states. However, a shock is generated if the clutch between the electric motor and the subordinate drive wheels is released when the drive force is weak and the vehicle travels at a low speed, such as in a creep travel state. In addition, gaps (backlash-creating spaces or the like) are momentarily closed and a shock is generated between the electric motor and the subordinate drive wheel system when a transition is made from a four-wheel drive state at a low-speed travel state to a two-wheel drive state.

The present invention was devised in view of this problem. In particular, the present invention is aimed at providing a driving force control apparatus for a four-wheel-drive vehicle capable of preventing shocks from being generated during clutch engagement or release in a low-speed travel state.

To address the aforementioned problem, a vehicle driving force control apparatus is provided for a vehicle having a drive source configured to drive a first drive wheel, and a clutch disposed between the first drive wheel and the drive source. The vehicle driving force control apparatus comprises travel speed sensor and a clutch engagement control section. The travel speed sensor is configured to detect a travel speed of the vehicle. The clutch engagement control section is configured to control an engagement of the clutch. The clutch engagement control section is further configured to maintain the engagement of the clutch, when the travel speed of the vehicle is below a prescribed speed.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
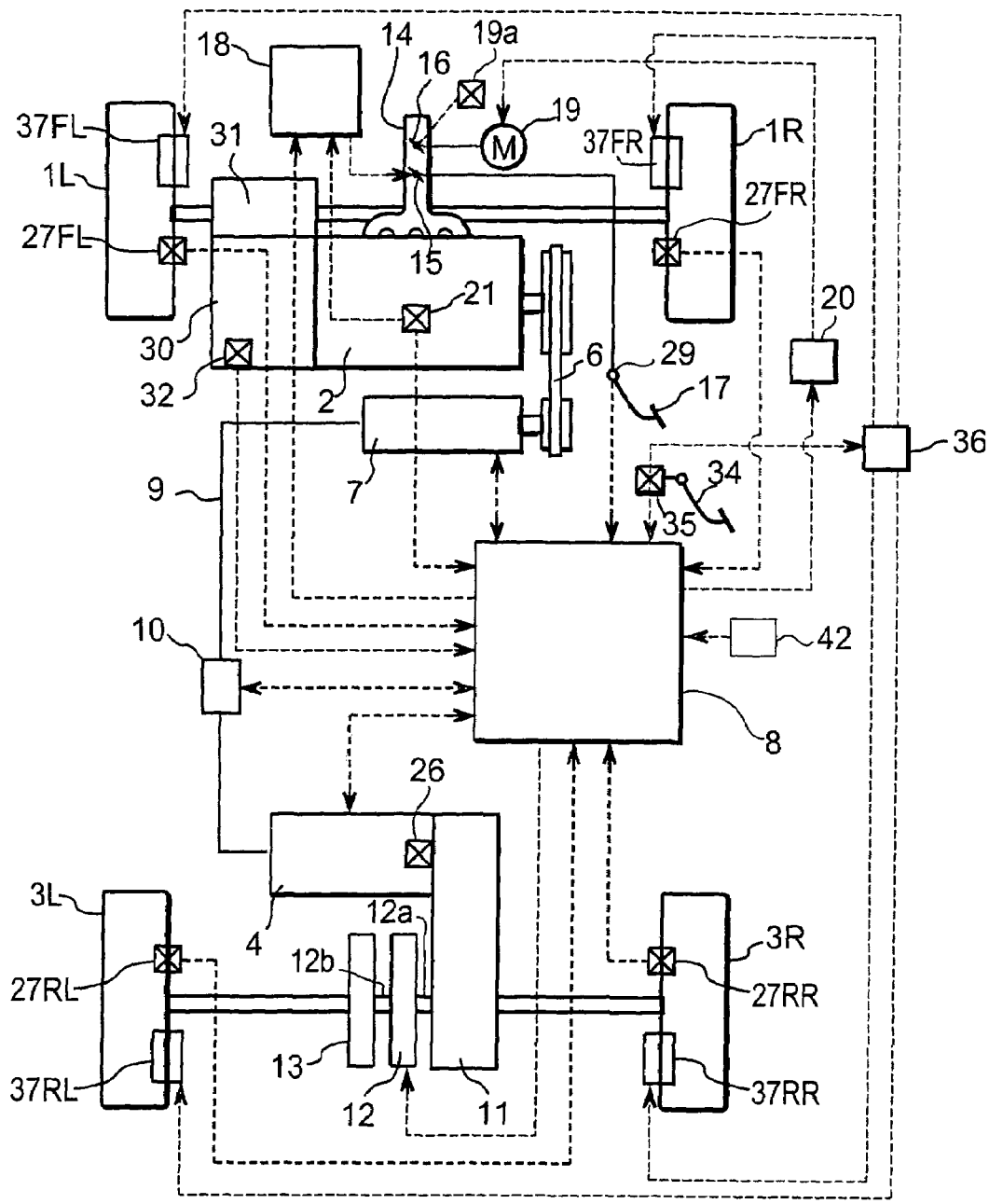
FIG. 1 is a schematic block diagram of a vehicle equipped with a vehicle driving force control apparatus in accordance with a first embodiment of the present invention.

Referring initially to FIG. 1, a vehicle driving force control apparatus will now be explained in accordance with a first embodiment of the present invention. As seen in FIG. 1, a four wheel drive vehicle is diagrammatically illustrated that is equipped with the vehicle driving force control apparatus in accordance with the present invention. As shown in FIG. 1, the vehicle in accordance with this embodiment has left and right front wheels 1L and 1R that are driven by an internal combustion engine or main drive source 2, and left and right rear wheels 3L and 3R that are driven by an electric motor or subordinate drive source 4, which is preferably a direct current (DC) electric motor. Thus, the front wheels 1L and 1R serve as the main drive wheels, while the rear wheels 3L and 3R serve as the subordinate drive wheels. An endless drive belt 6 transfers power from the internal combustion engine 2 to a generator 7, which supplies electrical energy to the electric motor 4.

The generator 7 rotates at a rotational speed Nh that is equal to the product of the rotational speed Ne of the internal combustion engine 2 and the pulley ratio of the endless drive belt 6. The load placed on the internal combustion engine 2 by the generator 7 due to the field current Ifh of the generator 7 is adjusted by the 4WD controller 8 to generate a voltage corresponding to the load torque. The voltage generated by the generator 7 can be supplied to the electric motor 4 through the electrical line 9. A junction box 10 is provided at an intermediate point in the electrical line 9 between the electric motor 4 and the generator 7. The drive shaft of the electric motor 4 can be connected to the rear wheels 3L and 3R via a reduction gear 11, a clutch 12 and a differential gear 13 in a conventional manner.

The clutch 12 is preferably an electromagnetic clutch having an input shaft 12a coupled to the electric motor 4 via the reduction gear 11, and an output shaft 12b coupled to the rear wheels 3L and 3R via the differential gear 13. Preferably, the clutch 12 is turned on to perform an engagement operation in which the input and output shafts 12a and 12b are connected such that the drive torque from the electric motor 4 is transmitted to the rear wheels 3L and 3R. When the clutch 12 is turned off, a disengagement or release operation occurs in which the input and output shafts 12a and 12b are disengaged such that the drive torque from the electric motor 4 is no longer transmitted to the rear wheels 3L and 3R. Thus, when the clutch 12 is engaged, the vehicle is in a four-wheel (multi-wheel) drive state in which all of the wheels 1L, 1R, 3L and 3R are driven. When the clutch 12 is released, the vehicle is in a two-wheel (non-all wheel) drive state in which only the front wheels 1L and 1R are driven by the internal combustion engine 2.

It is preferable in accordance with the present invention to release the clutch 12, during the vehicle traveling, such that substantially no shock occurs in the vehicle, or at least the shock to the vehicle is below a prescribed limit. Preferably, the clutch 12 is released in accordance with the present invention when the vehicle is traveling such that the drive torque of the electric motor 4 is sufficient to avoid a vehicle shock above a prescribed limit.

In particular, the driving force control apparatus in accordance with the present invention is configured such that the clutch 12 between the electric motor 4 and the subordinate drive wheels 3L and 3R is maintained in an engaged state when the travel speed of the vehicle is at or below a low-speed prescribed value, making it possible to avoid shocks from being generated when the clutch 12 is released in a low-speed travel state such as during creep travel. In addition, shocks are prevented from being generated because a structure is provided in which the subordinate drive wheels 3L and 3R are driven by an electric motor torque that allows the vehicle to travel at a very low speed; or by an electric motor torque capable of providing a vehicle speed that is equal to or greater than the vehicle speed provided by the creep torque of the internal combustion engine; or by an electric motor torque that is substantially equal to or greater than the creep torque provided by the internal combustion engine 2 even without the driver operating the accelerator pedal when the travel speed of the vehicle is at or below the low-speed prescribed value, and the clutch between the electric motor and the subordinate drive wheels is engaged.

A main throttle valve 15 and a sub throttle valve 16 are disposed inside the intake passage 14 (e.g., an intake manifold) of the internal combustion engine 2. The throttle opening of the main throttle valve 15 is adjusted/controlled in accordance with the amount of depression of the accelerator pedal 17, which also constitutes or functions as an accelerator position detecting device or sensor, or a throttle opening instructing device or sensor. In order to adjust the throttle opening of the main throttle valve 15, the main throttle valve 15 is either mechanically linked to the depression amount of the accelerator pedal 17, or adjusted/controlled electrically by an engine controller 18 in accordance with the depression amount detection value from an accelerator sensor 29 that detects the depression amount of the accelerator pedal 17 or the degree of opening of the main throttle valve 15. The depression amount detection value from the accelerator sensor 29 is outputted as a control signal to the 4WD controller 8. The accelerator sensor 29 constitutes an acceleration or throttle instruction sensor. Thus, the phrase "accelerator position opening degree" as used herein refers to either a throttle opening amount of the main throttle valve 15 or a depression amount of the accelerator pedal 17 or similar accelerator device.

The sub throttle valve 16 uses a stepper motor 19 as an actuator for adjusting its throttle opening. Specifically, the throttle opening of the sub throttle valve 16 is adjusted/controlled by the rotational angle of the stepper motor 19, which corresponds to the step count. The rotational angle of the stepper motor 19 is adjusted/controlled by a drive signal from the motor controller 20. The sub throttle valve 16 is provided with a throttle sensor 19a shown in FIG. 2. The step count of the stepper motor 19 is feedback-controlled based on the throttle opening detection value detected by this throttle sensor 19a. The output torque of the internal combustion engine 2 can be controlled (reduced) independently of the driver's operation of the accelerator pedal 17 by adjusting the throttle opening of the sub throttle valve 16 so as to be smaller than the throttle opening of the main throttle valve 15.

The apparatus is also equipped with an engine rotational speed sensor 21 that detects the rotational speed Ne of the internal combustion engine 2. The engine rotational speed sensor 21 outputs a control signal that is indicative of the engine rotational speed Ne to both the engine controller 18 and the 4WD controller 8.

As shown in the FIG. 1, the engine output torque Te of the internal combustion engine 2 is transferred to the left and right front wheels 1L and 1R through an automatic transmission 30 using a torque converter and a differential gear 31 in a conventional manner. A portion of the engine output torque Te of the internal combustion engine 2 is transferred to the generator 7 using the endless drive belt 6 to supply electrical energy to the electric motor 4. In other words, the generator 7 is rotated at a rotational speed Nh, which is obtained by multiplying the rotational speed Ne of the internal combustion engine 2 by the pulley ratio of the endless drive belt 6.

The transmission 30 is provided with a shift position detecting device or sensor 32 (gear ratio detecting device) that is configured and arranged to detect the current gear range of the automatic transmission 30. The shift position detecting sensor 32 is configured and arranged to output or send a detected shift position signal that is indicative of the current gear range of the transmission 30 to the 4WD controller 8.

A brake pedal 34 is provided that constitutes a brake instructing/operating section. The stroke amount of the brake pedal 34 is detected by a brake stroke sensor 35, which constitutes a brake operation amount sensor. The brake stroke sensor 35 outputs the brake stroke amount it detects to a brake controller 36 and the 4WD controller 8.

The brake controller 36 controls the braking force acting on the vehicle by controlling the braking devices (e.g., disc brakes) 37FL, 37FR, 37RL and 37RR installed on the wheels 1L,1R, 3L and 3R in response to the inputted brake stroke amount by the brake pedal 34.

Figure 2:
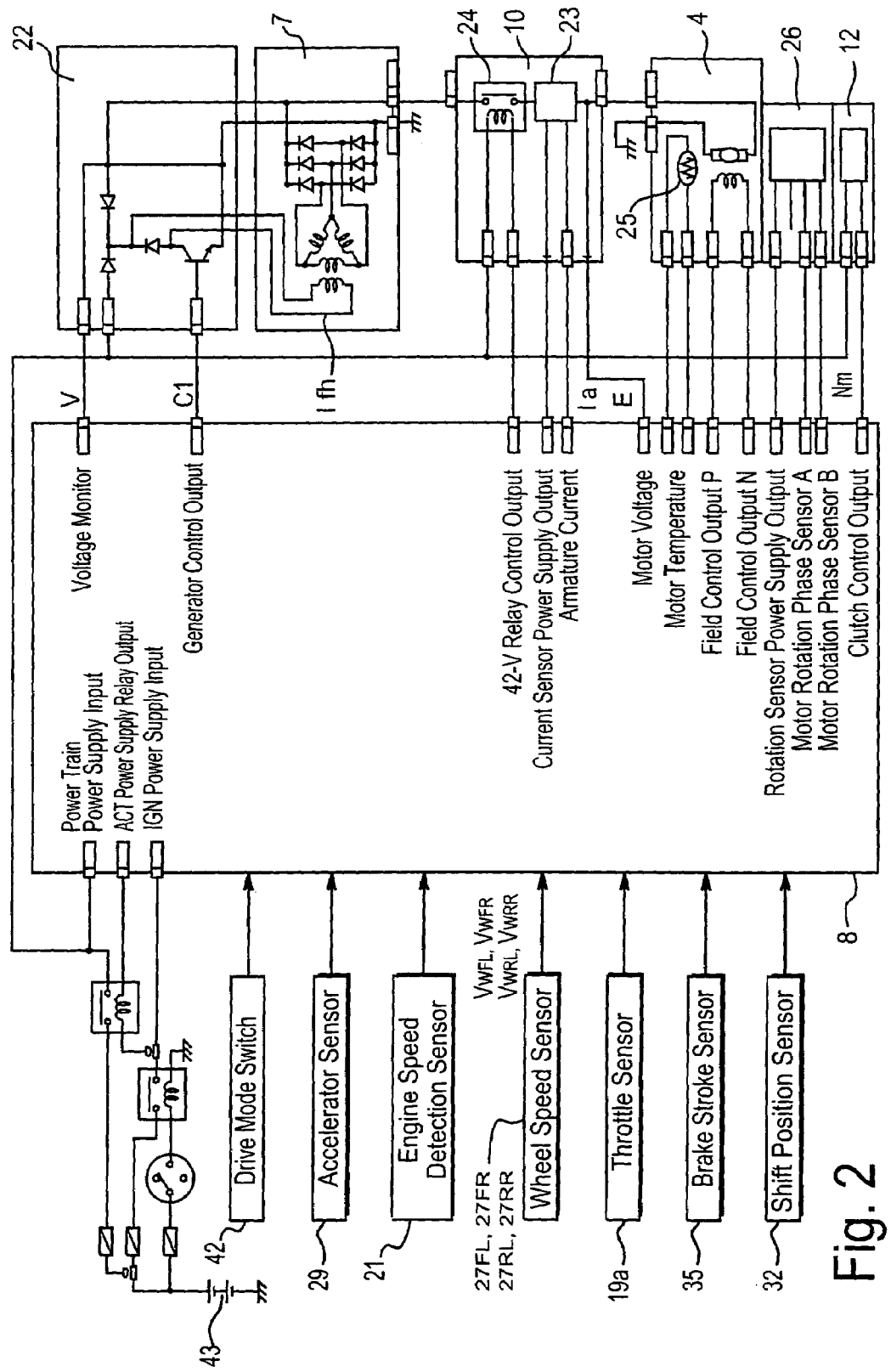
FIG. 2 is a block diagram of a control system for the vehicle driving force control apparatus in accordance with the first embodiment of the present invention.

As shown in FIG. 2, the generator 7 is equipped with a voltage adjuster 22 (regulator) for adjusting the output voltage V. The 4WD controller 8 controls the generator load torque Th against the internal combustion engine 2 and the generated voltage V by adjusting the field current Ifh such as controlling a generator control command value C1 (duty ratio or field current value). The voltage adjuster 22 receives the generator control command value C1 (duty ratio or field current value) from the 4WD controller 8 and adjusts the field current Ifh of the generator 7 to a value corresponding to the generator control command value C1. The voltage adjuster 22 is also configured and arranged to detect the output voltage V of the generator 7 and then output the detected voltage value to the 4WD controller 8. Additionally, the rotational speed Nh of the generator 7 can be computed based on the rotational speed Ne of the internal combustion engine 2 and the pulley ratio of the endless drive belt 6.

A current sensor 23 is provided inside the junction box 10. The current sensor 23 detects the current value Ia of the electrical power supplied from the generator 7 to the electric motor 4 and outputs a detected armature current signal to the 4WD controller 8. The voltage value flowing through the electrical line 9 is detected by the 4WD controller 8 to produce a control signal indicative of the voltage across the electric motor 4. A relay 24 shuts off or connects the voltage (current) supplied to the electric motor 4 in accordance with a control command from the 4WD controller 8.

A control command from the 4WD controller 8 controls the field current Ifm of the electric motor 4. Thus, the adjustment of the field current Ifm by the 4WD controller 8 adjusts the drive torque Tm of the electric motor 4. A thermistor 25 measures the temperature of the electric motor 4 and produces a control signal indicative of the temperature of the electric motor 4 that is outputted to the 4WD controller 8.

The vehicle driving force control apparatus is also equipped with a motor rotational speed sensor 26 that detects the rotational speed Nm of the drive shaft of the electric motor 4. The motor rotational speed sensor 26 outputs a control signal indicative of the detected rotational speed of the electric motor 4 to the 4WD controller 8. The motor rotational speed sensor 26 constitutes an input shaft rotational speed detector or sensor of the clutch 12.

The clutch 12 is preferably an electromagnetic clutch that connects and disconnects in response to a clutch control command issued from the 4WD controller 8. Of course, a hydraulic clutch can be used for clutch 12 is certain situations to carry out the present invention. Thus, the clutch 12 transmits torque from the electric motor 4 to the rear wheels 3L and 3R at a torque transfer rate corresponding to the clutch control command from the 4WD controller 8.

A drive mode switch 42 is provided to manually issue a clutch control command that allows the driver to manually select either a four-wheel drive mode or a two-wheel drive mode when the vehicle is below a predetermined vehicle speed.

A 12-volt battery 43 supplies operating electric power to the 4WD controller 8 with a 12-volt relay is installed in the 12-volt electric power supply line thereof in order to connect and disconnect the power to the clutch 12, which is preferably an electromagnetic clutch.

The wheels 1L, 1R, 3L and 3R are provided with wheel speed sensors 27FL, 27FR, 27RL, and 27RR, respectively. Each speed sensor 27FL, 27FR, 27RL, and 27RR outputs a pulse signal corresponding to the rotational speed of the respective wheel 1L, 1R, 3L and 3R to the 4WD controller 8. Each of the pulse signals serves as a wheel speed detection value indicative of the rotational speed of the respective wheel 1L, 1R, 3L and 3R, respectively. The wheel speed sensors 27RL and 27RR constitute an output shaft rotational speed detector or sensor of the clutch 12.

Figure 3:
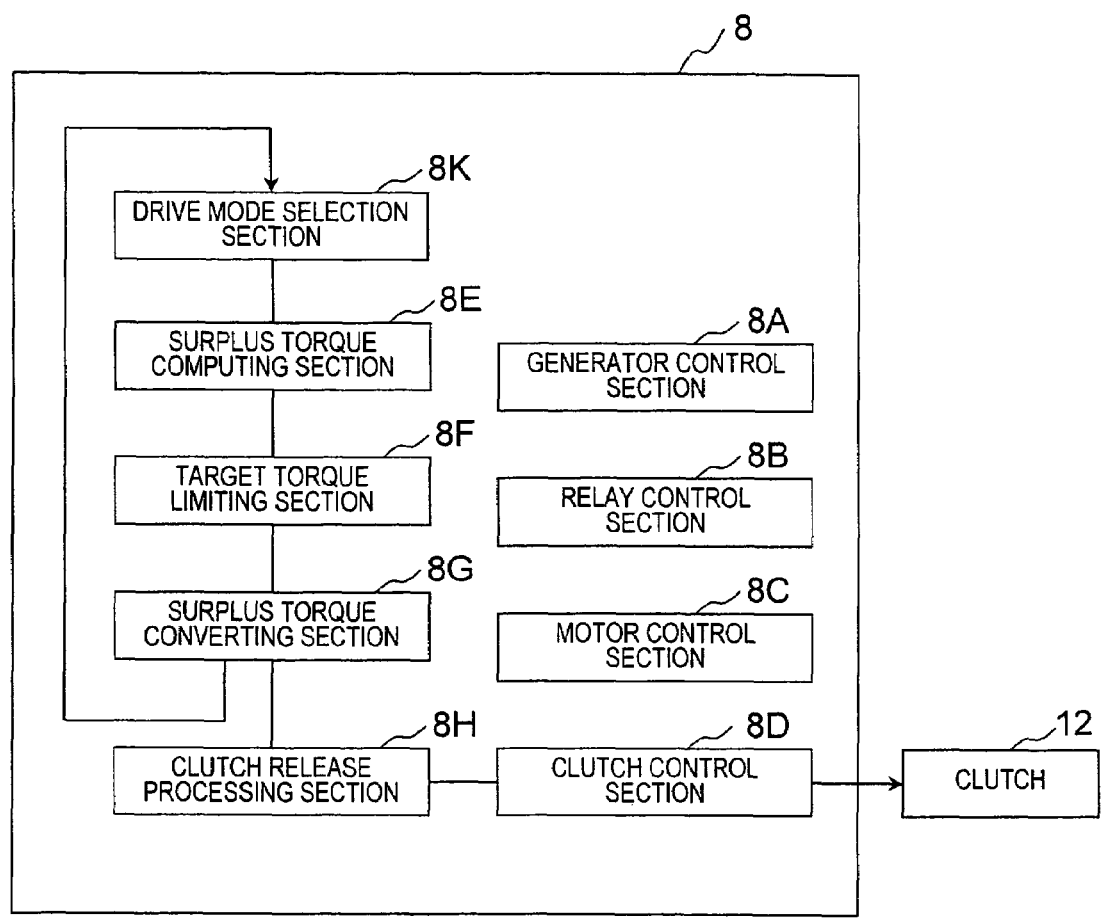
FIG. 3 is a block diagram illustrating the 4WD controller for the vehicle driving force control apparatus with a flow chart showing the processing procedure executed by the 4WD controller for the vehicle driving force control apparatus in accordance with the first embodiment of the present invention.

As shown in FIG. 3, the 4WD controller 8 is equipped with a generator control section 8A, a relay control section 8B, a motor control section 8C, a clutch control section 8D, a surplus torque computing section 8E, a target torque limiting section 8F, a surplus torque converting section 8G, a clutch release processing section 8H, and a drive mode selection section 8K. The clutch control section 8D and the clutch release processing section 8H constitutes or functions as a clutch engagement control section for the clutch 12. The clutch release processing section 8H constitutes or includes an output shaft stop estimating section, an input shaft stop estimating section, and a clutch connection command outputting section.

The 4WD controller 8 is a control unit that preferably includes a microcomputer with a 4WD control program that is operatively coupled to the internal combustion engine 2 and the electric motor 4 to control the torque applied to the left and right front wheels 1L and 1R by the internal combustion engine 2 and the torque applied to the left and right rear wheels 3L and 3R by an electric motor 4 as discussed below. The 4WD controller 8 can also include other conventional components such as an input interface circuit, an output interface circuit, and storage devices such as a ROM (Read Only Memory) device and a RAM (Random Access Memory) device. The memory circuit stores processing results and control programs. The RAM of the 4WD controller 8 stores statuses of operational flags and various control data for the control program. The ROM of the 4WD controller 8 stores various operations for the control program. The 4WD controller 8 is capable of selectively controlling any of the components of the driving force control apparatus in accordance with the control program. It will be apparent to those skilled in the art from this disclosure that the precise structure and algorithms for 4WD controller 8 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

Through the voltage adjusting device 22, the generator control section 8A monitors the generated voltage V of the generator 7 and adjusts the generated voltage V of the generator 7 to the required voltage by adjusting the field current Ifh of the generator 7. Thus, the generator control section 8A includes a generation load torque adjusting section.

The relay control section 8B controls shutting off and connecting the power supply from the generator 7 to the electric motor 4. The motor control section 8C adjusts the torque of the electric motor 4 to the required value by adjusting the field current Ifm of the electric motor 4. The motor control section 8C constitutes the electric motor torque control means of the present invention.

The clutch control section 8D controls the state of the clutch 12 by outputting a clutch control command to the clutch 12. The clutch control section 8D constitutes part of the clutch engagement control section of the present invention.

The drive mode selection section 8K includes the drive mode switch 42 that allows the driver to manually select either a four-wheel drive mode or a two-wheel drive mode when the vehicle is below a predetermined vehicle speed. Thus, the drive mode switch 42 of the present invention constitutes part of a drive mode selection section that is configured to select one of a multi-wheel drive mode and a non-all wheel drive mode. When the drive mode switch 42 is switched to change from a four-wheel drive mode to a two-wheel drive, the 4WD controller 8 executes the processing of the clutch control section 8D and the clutch release processing section 8H.

As shown in FIG. 3, at a prescribed sampling time cycle, the 4WD controller 8 executes the processing of the surplus torque computing section 8E, the target torque limiting section 8F, and the surplus torque converting section 8G in sequence based on the input signals. Together, the surplus torque computing section 8E, the target torque limiting section 8F, and the surplus torque converting section 8G constitute an output torque control section of the 4WD controller 8.

Figure 4:
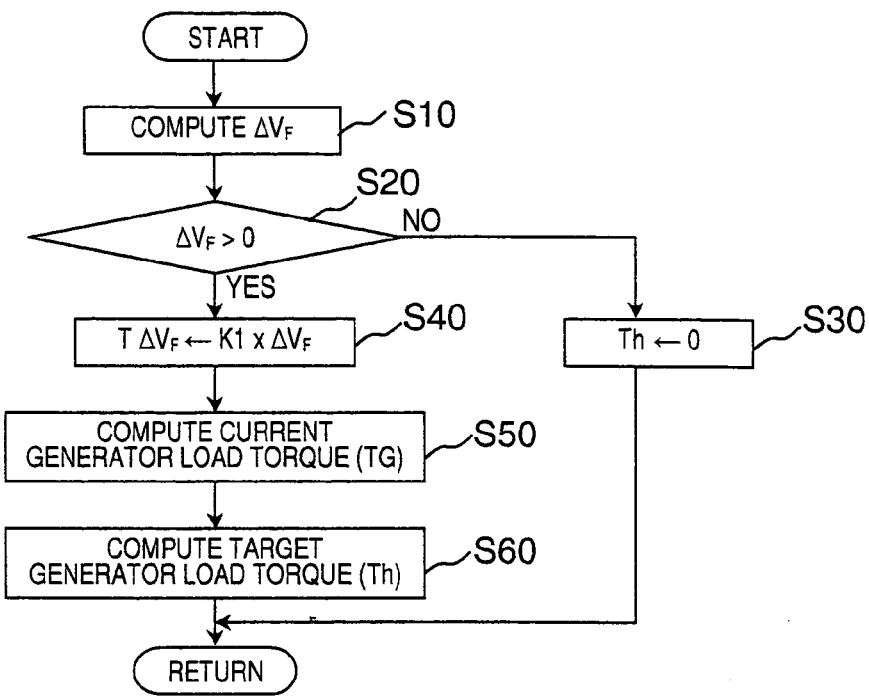
FIG. 4 is a flow chart showing the processing executed by the surplus torque computing section for the vehicle driving force control apparatus of the first embodiment of the present invention.

Next, the surplus torque computing section 8E will be discussed which executes the processing shown in FIG. 4. First, in step S10, the wheel speeds computed based on the signals from the wheel speed sensors 27FL, 27FR, 27RL and 27RR are used to subtract the wheel speed of the rear wheels 3L and 3R (subordinate drive wheels) from the wheel speed of the front wheels 1L and 1R (main drive wheels) and find the slippage speed $\Delta V_F$, which is the magnitude of the acceleration slippage of the front wheels 1L and 1R. Then, the 4WD controller 8 proceeds to step S20.

The slippage speed $\Delta V_F$ can be calculated as follows. The average front wheel speed $V_{Wf}$ (which is the average of the left and right wheel speeds for the front wheels 1L and 1R) and the average rear wheel speed $V_{Wr}$ (which is the average of the left and right wheel speeds for the rear wheels 3L and 3R) are calculated using the following two Equations (1) and (2):

$$V_{Wf}=(V_{Wfl}+V_{Wfr})/2 \quad (1)$$

$$V_{Wr}=(V_{Wrl}+V_{Wrr})/2 \quad (2)$$

Now, the slippage speed (acceleration slippage magnitude) $\Delta V_F$ of the front or main drive wheels 1L and 1R is calculated by the differential between the average front wheel speed $V_{Wf}$ and the average rear wheel speed $V_{Wr}$, as set forth in the following Equation (3):

$$\Delta V_F = V_{Wf} - V_{Wr} \quad (3)$$

In step S20, the 4WD controller 8 determines whether or not the calculated slippage speed $\Delta V_F$ exceeds a prescribed value, such as zero. Thus, steps S10 and S20 constitute an acceleration slippage detection section that estimates if acceleration slippage is occurring in the front wheels 1L and 1R that is driven by the internal combustion engine 2. If slippage speed $\Delta V_F$ is determined to be zero or below, it is estimated that the front wheels 1L and 1R are not experiencing acceleration slippage and the 4WD controller 8 proceeds to step S30, where a target generator load torque Th is set to zero and the 4WD controller 8 returns to the beginning of the control loop.

Conversely, if in step S20 slippage speed $\Delta V_F$ is determined to be larger than zero, it is estimated that the front wheels 1L and 1R are experiencing acceleration slippage, and thus, control proceeds to step S40. In step S40, the absorption torque $T\Delta V_F$ required for suppressing the acceleration slippage of the front wheels 1L and 1R is calculated using the Equation (4) below and the 4WD controller 8 proceeds to step S50. The absorption torque $T\Delta V_F$ is an amount that is proportional to the acceleration slippage magnitude, as set forth in the following Equation (4):

$$T\Delta V_F = K1 \times \Delta V_F \quad (4)$$

where: K1 is a gain that is found through experimentation or the like.

In step S50, a current load torque TG of the generator 7 is calculated based on the Equation (5) below, and then the 4WD controller 8 proceeds to step S60.

$$TG = K2 \frac{V \times Ia}{K3 \times Nh} \quad (5)$$

where: V: voltage of the generator 7,
Ia: armature current of the generator 7,
Nh: rotational speed of the generator 7,
K3: efficiency, and
K2: coefficient.

In step S60, the surplus torque, i.e., the target generator load torque Th that the generator 7 should impose, is found based on the Equation (6) stated below, and the 4WD controller 8 returns to the beginning of the control loop.

$$Th = TG + T\Delta V_F \quad (6)$$

Figure 5:
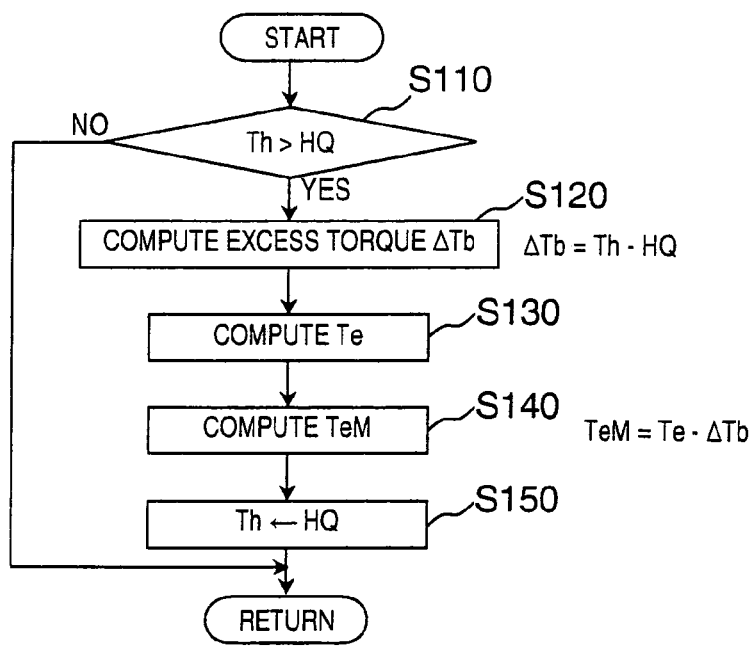
FIG. 5 is a flow chart showing the processing executed by the target torque limiting section for the vehicle driving force control apparatus of the first embodiment of the present invention.

Next, the processing executed by the target torque (control) limiting section 8F will be explained based on FIG. 5. The processing of the target generator load torque Th in the flow chart of FIG. 5 constitutes a generator control section configured to control a generation load torque of the generator 7 to substantially correspond to an acceleration slippage magnitude of the drive wheel, when the acceleration slippage detection section estimates acceleration slippage occurring in the drive wheel.

First, in step SI 10, the target torque limiting section 8F of the 4WD controller 8 determines whether or not the target generator load torque Th is larger than the maximum load capacity HQ of the generator 7. The 4WD controller 8 proceeds to the beginning of the control program to repeat the processing if the 4WD controller 8 determines that target generator load torque Th is less than or equal to the maximum load capacity HQ of the generator 7. Conversely, the 4WD controller 8 proceeds to step S120 if the 4WD controller 8 determines that the target generator load torque Th is larger than the maximum load capacity HQ of the generator 7.

In step S120, the excess torque ΔTb, which is the portion of target generation load torque Th that exceeds the maximum load capacity HQ, is found according to the following Equation (7):

$$\Delta Th = Th - HQ. \quad (7)$$

Then, the 4WD controller 8 proceeds to step S130.

In step S130, the current engine torque Te is computed based on the signals from the throttle sensor 19a and the engine rotational speed sensor 21 using an engine torque calculation map. Then, the 4WD controller 8 proceeds to step S140.

In step S140, the engine torque upper limit value TeM is calculated by subtracting the excess torque ΔTb from the engine torque Te, as set forth in the following Equation (8):

$$TeM = Te - \Delta Th. \quad (8)$$

After the engine torque upper limit value TeM is outputted to the engine controller 18, the 4WD controller 8 proceeds to step S150.

In step S150, the maximum load capacity HQ is assigned as the target generation load torque Th, and then the 4WD controller 8 returns to the beginning of the control loop.

Figure 6:
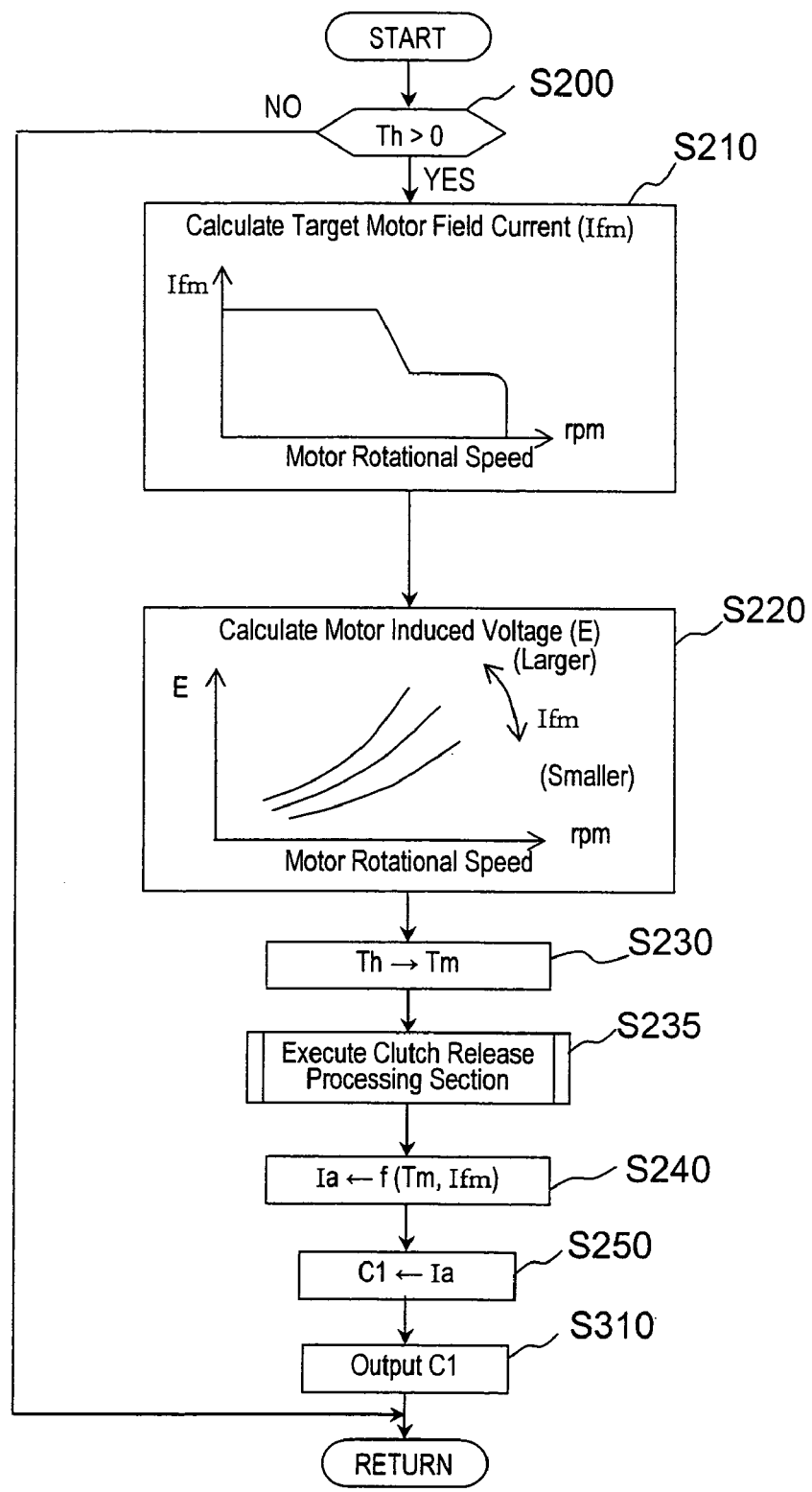
FIG. 6 is a flow chart showing the processing executed by the surplus torque converting section for the vehicle driving force control apparatus of the first embodiment of the present invention.

Next, the processing executed by the surplus torque converting section 8G will be explained based on FIG. 6.

First, in step S200, the 4WD controller 8 determines if the target generator load torque Th is larger than zero. If the target generator load torque Th is determined to be larger than zero, then the program of the 4WD controller 8 proceeds to step S210 because the front wheels 1L and 1R are experiencing acceleration slippage. If the 4WD controller 8 determines that the target generator load torque Th is less than or equal to zero, then the 4WD controller 8 returns to the beginning of the control loop because the front wheels 1L and 1R are not experiencing acceleration slippage.

In step S210, the rotational speed Nm of the electric motor 4 detected by motor speed sensor 26 is received as input. The target motor field current Ifm corresponding to the rotational speed Nm of the electric motor 4 is calculated and the target motor field current Ifm is outputted to the motor control section 8C. Then, processing proceeds to step S220.

In this embodiment, the target motor field current Ifm corresponding to the rotational speed Nm of the electric motor 4 is held to a fixed prescribed current value when rotational speed Nm is at or below a prescribed rotational speed, and the field current Ifm of the electric motor 4 is reduced by a known weak magnetic field control method when the electric motor 4 is rotating at or above a prescribed rotational speed. In short, when the electric motor 4 rotates at a high speed the motor torque decreases due to the rise in the motor induced voltage E. Therefore, as discussed earlier, when the rotational speed Nm of the electric motor 4 reaches or exceeds a prescribed value, the current flowing to the electric motor 4 is increased and the required motor torque Tm is obtained by reducing the field current Ifm of the electric motor 4 and lowering the induced voltage E. As a result, even if the electric motor 4 rotates at a high speed, the required motor torque Tm can be obtained because the motor induced voltage E is kept from rising and the motor torque is prevented from decreasing. Also, the price of the electronic control circuit can be reduced in comparison with continuous field current control because the motor field current Ifm is controlled in two stages: a stage for when the rotational speed is below a prescribed value, and another stage for when the rotational speed is at or above a prescribed value.

It is also acceptable to provide a motor torque correcting section that continuously corrects the required motor torque Tm by adjusting the field current Ifm in accordance with the rotational speed Nm of the electric motor 4 with respect to the required motor torque Tm. That is, instead of switching between two stages, the field current ffm of the electric motor 4 can be adjusted in accordance with the motor rotational speed Nm. As a result, even if the electric motor 4 rotates at a high speed, the required motor torque Tm can be obtained because the motor induced voltage E is kept from rising and the motor torque is prevented from decreasing. Furthermore, since a smooth motor torque characteristic can be obtained, the vehicle can travel with better stability than in the case of two-stage control and the vehicle can always be kept in a state where the motor driving efficiency is good.

In step S220, the induced voltage E of the electric motor 4 is calculated based on the target motor field current Ifm and the rotational speed Nm of the electric motor 4. Then, processing proceeds to step S230.

In step S230, the corresponding target motor torque Tm is calculated based on the generation load torque Th computed by the surplus torque computing section 8E. Then, processing proceeds to step S240.

In step S235, the clutch release processing section 8H, described below, is executed. The clutch release processing section 8H constitutes a clutch releasing section of the 4WD controller 8. In the clutch release processing section 8H, the clutch release command is issued when it is determined that a current target motor torque Tm(n) is approximately equal to the clutch disconnection or release torque, i.e., when the Equation (9) below is satisfied.

$$Tf - \alpha \leq Tm(n) \leq Tf + \alpha \quad (9)$$

where: α is the tolerance value.

The clutch disconnection or release torque Tf is the torque of the electric motor 4 at the moment when the clutch 12 is to be released and the acceleration of the clutch input shaft 12a and the acceleration of the clutch output shaft 12b are approximately equal, i.e., when the torque at the clutch 4 is approximately zero. It is preferred to correct the clutch disconnection torque Tf by an appropriate amount to compensate for the response delay of the clutch operation.

The clutch disconnection torque Tf is calculated using a map and computations based on such factors as the vehicle acceleration and the friction in the torque transmission path to the rear wheels, or is a value determined experimentally, and serves as the motor torque value required to achieve zero torque at the clutch 12 in accordance with the traveling state of the vehicle. The clutch disconnection torque Tf corresponds to the sum of the torque due to friction of the electric motor 4 and the reduction gear 11 and the torque required to accelerate the electric motor 4 and the reduction gear 11 at the same acceleration rate as the rear wheels 3L and 3R, but comprises only the torque due to friction of the electric motor 4 and the reduction gear 11 when during normal travel. It is also acceptable for the clutch disconnection torque Tf to be a fixed value determined experimentally.

Then, the 4WD controller 8 proceeds to step S240. In step S240, the corresponding target armature current Ia is calculated using the target motor torque Tm and the target motor field current Ifm as variables. Then, processing proceeds to step S250.

In step S250, the duty ratio C1 equivalent to the target current value Ia of the generator 7 is computed from the target armature current Ia. The duty ratio C1 serves as a generator control command value. Processing then proceeds to step S310.

In step S310, the generator control command value or duty ratio C1 calculated in step S250 is outputted to the generator control section 8A, and the system then returns to the main program.

Figure 7:
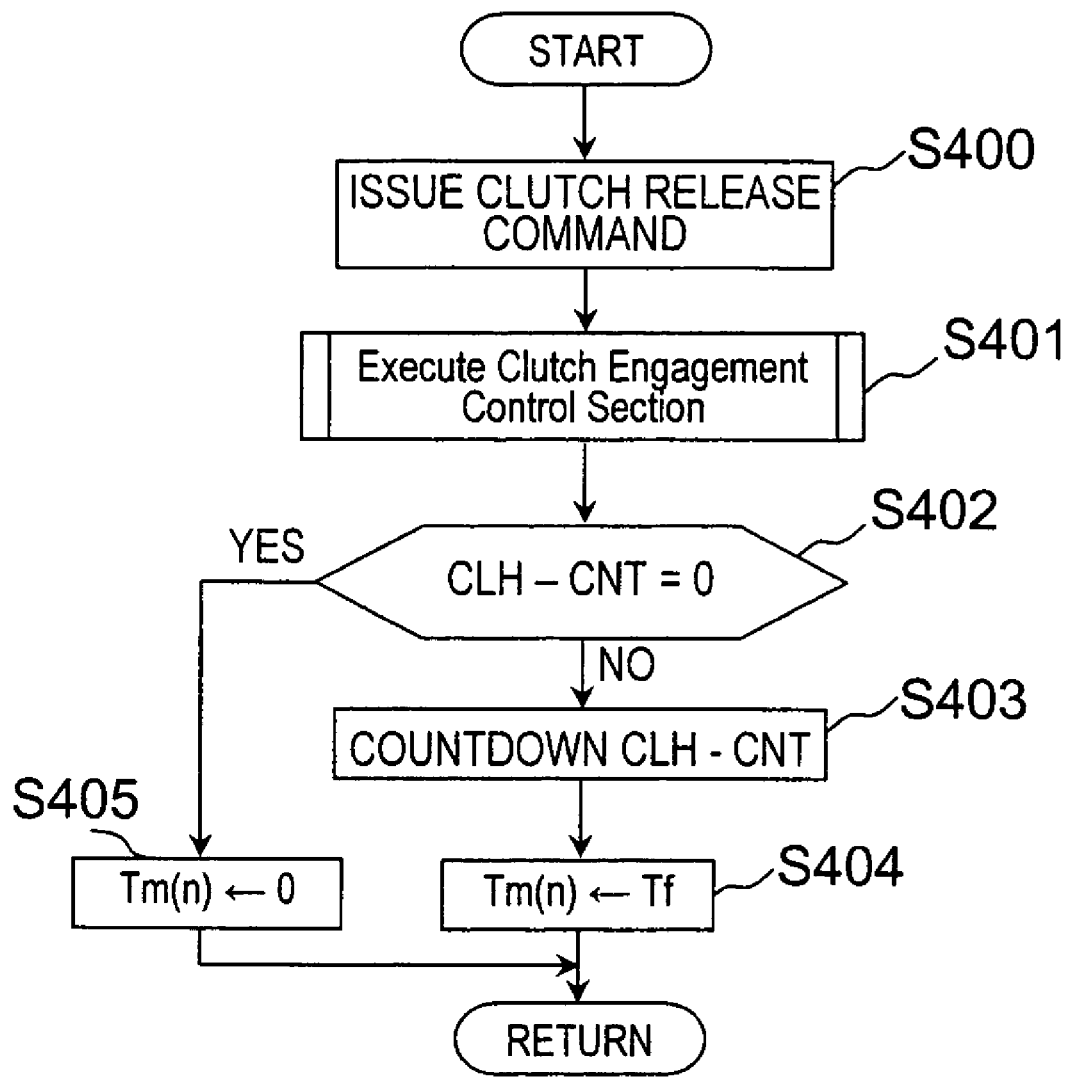
FIG. 7 is a flow chart showing the processing sequence executed by the clutch release processing section for the vehicle driving force control apparatus illustrated in FIG. 1 in accordance with the first embodiment of the present invention.

The clutch release processing section 8H will now be described with reference to FIG. 7. The clutch release processing section 8H starts up when it is time for the vehicle to shift from the four-wheel drive state to the two-wheel drive state. In step S400, the 4WD controller 8 outputs a clutch release command and proceeds to step S40 1.

Figure 9:
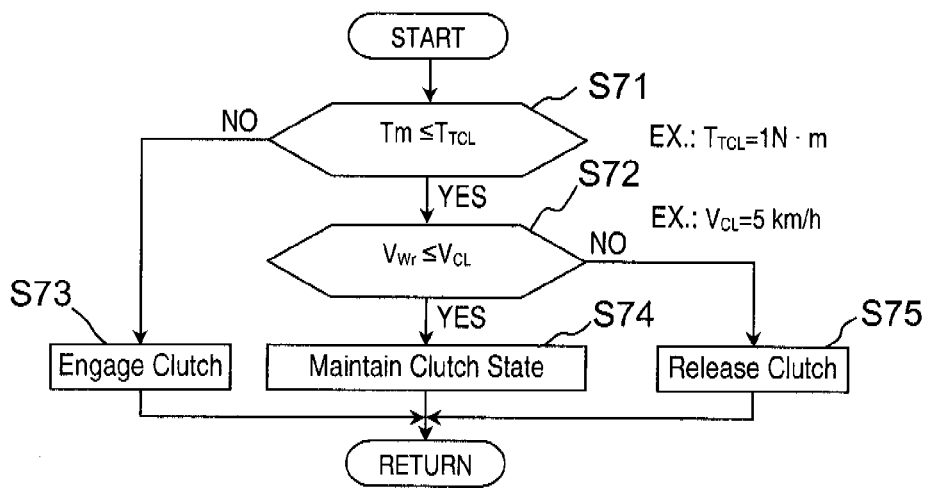
FIG. 9 is a flow chart showing the processing executed by the clutch control section in accordance with the first embodiment based on the present invention.

In step S401, the 4WD controller 8 executed processing of the clutch control section 8D of FIG. 9. In particular, the clutch control section 8D of FIG. 9 is configured such that the clutch 12 between the electric motor 4 and the subordinate drive wheels 3L and 3R is maintained in an engaged state when the travel speed of the vehicle is at or below a low-speed prescribed value, making it possible to avoid shocks from being generated when the clutch 12 is released in a low-speed travel state such as during creep travel.

There is a clutch response delay time that elapses between the time when the clutch release command is issued and the time when the clutch 12 is actually released. This clutch response delay time is ascertained in advance and taken into account in the processing of the clutch release.

In step S402, the 4WD controller 8 determines if the torque holding time counter CLH–CNT is zero. If the torque holding time counter CLH–CNT is zero, the 4WD controller 8 proceeds to step S405 where it sets the target motor torque Tm(n) to zero so as to stop the motor torque from being held at fixed value and then returns to the beginning of the control loop.

Meanwhile, if the torque holding time counter CLH–CNT is larger than zero, the 4WD controller 8 proceeds to step S403 where it counts down the torque holding time counter CLH-CNT. In step S404, the 4WD controller 8 sets the current motor torque Tm(n) equal to the prior motor torque Tm(n−1) to assign the clutch release torque Tf as the target motor torque Tm(n) in order to hold the target motor torque Tm(n) at the fixed value of the clutch release torque Tf. The 4WD controller 8 then returns to the beginning of the control loop.

The aforementioned torque holding time counter CLH–CNT is initialized while the vehicle is in the four-wheel drive state. The torque holding time counter CLH–CNT is initialized to a value that absorbs the fluctuations in the clutch response delay and ensures that the clutch 12 is released reliably when the actual motor torque value is substantially held at the clutch release torque Tf.

The clutch release processing section 8H constitutes a clutch release section and a clutch release torque control section.

Next, the processing executed by the engine controller 18 will be described with reference to FIG. 8. In accordance with a prescribed sampling time cycle, the engine controller 18 executes the processing show in FIG. 8 based on the input signals.

Specifically, in step S610, the engine controller 18 computes the target output torque TeN requested by the driver based on the detection signal from the accelerator sensor 29 and then proceeds to step S620.

In step S620, the engine controller 18 determines if the output torque upper limit TeM has been received from the 4WD controller 8. If it is determined that the output torque limit has been received, the engine controller 18 proceeds to step S630. Otherwise, the engine controller 18 proceeds to step S670.

In step S630, the engine controller 18 determines if the output torque upper limit TeM is larger than the target output torque TeN. If the output torque upper limit TeM is larger, the engine controller 18 proceeds to step S640. Meanwhile, if the output torque upper limit TeM is smaller than or equal to the target output torque TeN, the engine controller 18 proceeds to step S670.

In step S640, the engine controller 18 assigns the value of the output torque upper limit TeM to as the target output torque TeN, thereby increasing the target output torque TeN, and the program then proceeds to step S670.

In step S670, the engine controller 18 calculates the current output torque Te based on the throttle opening degree, the engine rotational speed, etc., and then the program proceeds to step S680.

In step S680, the engine controller 18 calculates the deviation $\Delta Te'$ of the target output torque TeN from the current output torque Te using the Equation (10) shown below and then proceeds to step S690.

$$\Delta Te' = TeN - Te \quad (10)$$

In step S690, the engine controller 18 calculates a change $\Delta\theta$ in the throttle opening degree $\theta$ in accordance with the deviation $\Delta Te'$ and outputs a throttle opening degree signal corresponding to the throttle opening degree change amount $\Delta\theta$ to the stepper motor 19. Then, the program of the engine controller 18 returns to the beginning of the control loop.

Described below is the processing of data for clutch engagement control in FIG. 9 as performed by the clutch control section 8D. The flow chart of FIG. 9 can also be referred to as a part of the clutch engagement control section. The data for clutch engagement control is processed by executing timer interrupt handling at prescribed sampling intervals $\Delta T$. This type of data processing is not specifically provided with a step for communication, but the necessary information is read as needed, and the computed result is outputted as needed. In addition, the data processing performed by the clutch control section 8D can be any of a large number of types other than that shown in FIG. 9. Also the release control of the clutch 12 in particular is performed as needed in situations in which a four-wheel drive state is not required.

According to this type of data processing, it is first determined in step S71 whether the target motor torque Tm is equal to or less than a motor torque prescribed value $T_{TCL}$ that has been preset in advance to, for example, about 1 N.m. The program proceeds to step S72 if the target motor torque Tm is equal to or less than the motor torque prescribed value $T_{TCL}$. Conversely, the program proceeds to step S73 if the target motor torque Tm is not equal to or less than the motor torque prescribed value $T_{TCL}$.

In step S73, the clutch engagement control is performed by the clutch control section 8D in accordance with the separate data processing performed within the same step. Then, the system then returns to the main program. Specifically, the rotational speed of the electric motor 4 and the average rear wheel speed $V_{Wr}$ of the rear wheels 3L and 3R are rotatably synchronized when four-wheel drive is requested, and the clutch 12 is engaged when the differential between the two is at or below a prescribed value.

In step S72, the 4WD controller 8 determines whether the average rear wheel speed $V_{Wr}$, which is equal or substantially equal to the travel speed of the auto vehicle, is equal to or less than a low-speed prescribed value $V_{CL}$ designed to provide a margin to the travel speed of the main drive wheels during creep travel on a flat road that has been set in advance to, for example, about 5 km/h; and the program proceeds to step S74 if the average rear wheel speed $V_{Wr}$ is equal to or less than the low-speed prescribed value $V_{CL}$, and to step S75 if this is not the case.

In step S75, clutch release control is performed by the clutch control section 8D in accordance with the separate data processing performed within the same step, and the system then returns to the main program.

Meanwhile, control for maintaining the clutch 12 in an engaged state is performed in step S74 in accordance with a separate data processing performed within the same step, and the system then returns to the main program. The control for maintaining the clutch 12 in an engaged state can, for example, entail maintaining an engaged state if such a state is involved, and maintaining a released state if such a state is involved. In other words, in step S74, the engagement state of the clutch 12 is maintained (either engaged or disengaged).

According to this type of data processing, the clutch 12 is engaged and a four-wheel drive state is established when the target motor torque Tm, thus set, is greater than the motor torque prescribed value $T_{TCL}$.

By contrast, the clutch 12 is released when the target motor torque Tm is equal to or less than the motor torque prescribed value $T_{TCL}$, and the average rear wheel speed $V_{Wr}$, which is equal to the travel speed of the vehicle, is greater than the low-speed prescribed value $V_{CL}$.

The clutch 12 maintains its engaged state when the target motor torque Tm is equal to or less than the motor torque prescribed value $T_{TCL}$, and the average rear wheel speed $V_{Wr}$, which is equal to the travel speed of the vehicle, is equal to or less than the low-speed prescribed value $V_{CL}$. Specifically, an engaged state is maintained if such a state is involved, and a released state is maintained if such a state is involved. In other words, the engagement state of the clutch 12 is maintained (either engaged or disengaged).

Now the operation of an apparatus constituted as described heretofore will be described. The following explanation assumes that the designated drive mode is set to the four-wheel drive mode, and that the clutch 12 is not connected when the designated drive mode is set to the two-wheel drive mode.

When the torque transferred from the internal combustion engine 2 to the front wheels 1L and 1R is larger than the road surface reaction force limit torque, i.e., when acceleration slippage occurs in the front wheels 1L and 1R, which are the main drive wheels, due to the road surface friction coefficient μ being small, or the driver depressing the accelerator pedal 17 too deeply, or the like, the drive torque transferred to the front wheels 1L and 1R is adjusted so as to approach the road surface reaction force limit torque of the front wheels 1L and 1R by having the generator 7 generate at a generator load torque Th corresponding to the magnitude of the acceleration slippage thereof. This results in suppression of the acceleration slippage of the front wheels 1L and 1R, which are the main drive wheels.

Furthermore, the acceleration performance of the vehicle is improved by adopting an approach in which the surplus power generated by the generator 7 is used to drive the electric motor 4 as well as the rear wheels 3L and 3R, which are the subordinate drive wheels.

At this time, the energy efficiency is increased and fuel consumption improved because the electric motor 4 is driven by a surplus torque that has exceeded the road surface reaction force limit torque of the main drive wheels 1L and 1R.

Here, if the rear wheels 3L and 3R were always driven, several energy conversions (mechanical energy→electrical energy→mechanical energy) take place, creating energy losses that are proportional to the conversion efficiencies. Therefore, the acceleration performance of the vehicle would decline in comparison with a case where only the front wheels 1L and 1R were driven. Consequently, it is generally desired that driving of the rear wheels 3L and 3R be suppressed. By contrast, this embodiment takes into consideration the fact that when traveling on a slippery road surface or the like, even if all of the output torque Te of the internal combustion engine 2 is transferred to the front wheels 1L and 1R, not all of the torque will be used as driving force. The driving force that cannot be utilized efficiently by the front wheels 1L and 1R is outputted to the rear wheels 3L and 3R, and the acceleration performance is improved.

Figure 10:
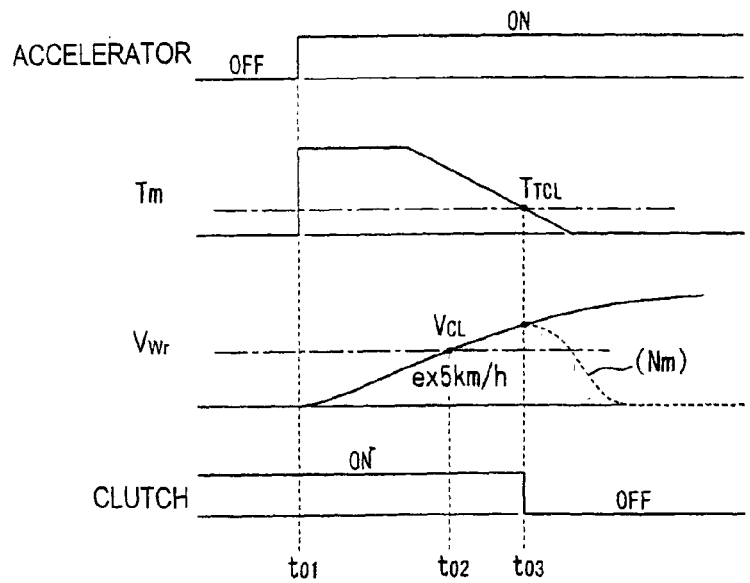
FIG. 10 is a timing chart illustrating the action of data processing executed by the clutch control section in FIG. 9.
Figure 11:
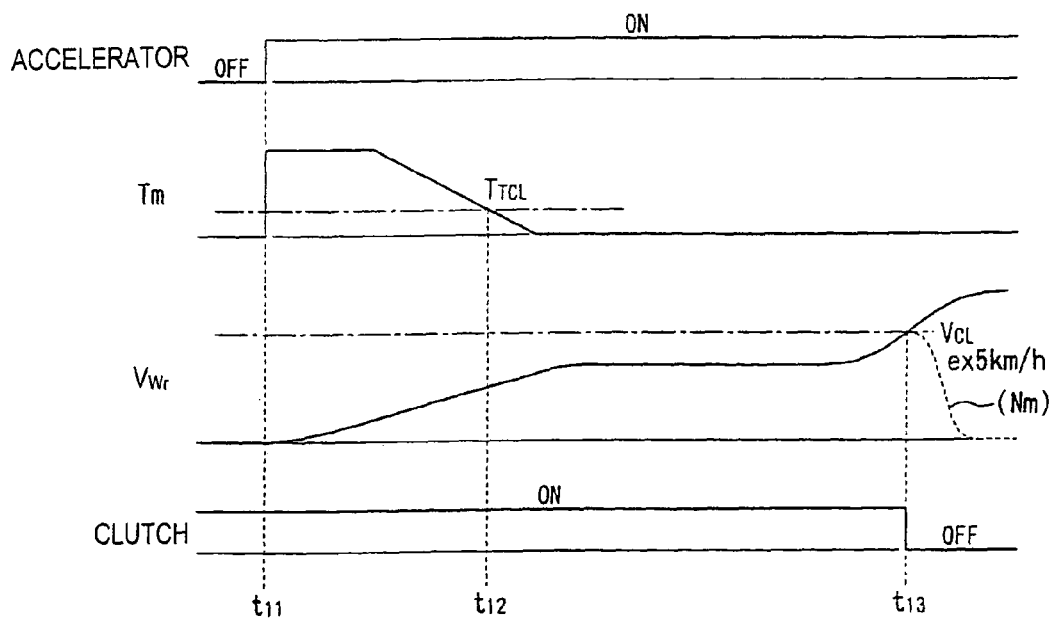
FIG. 11 is a timing chart illustrating the action of data processing executed by the clutch control section in FIG. 9.
Figure 12:
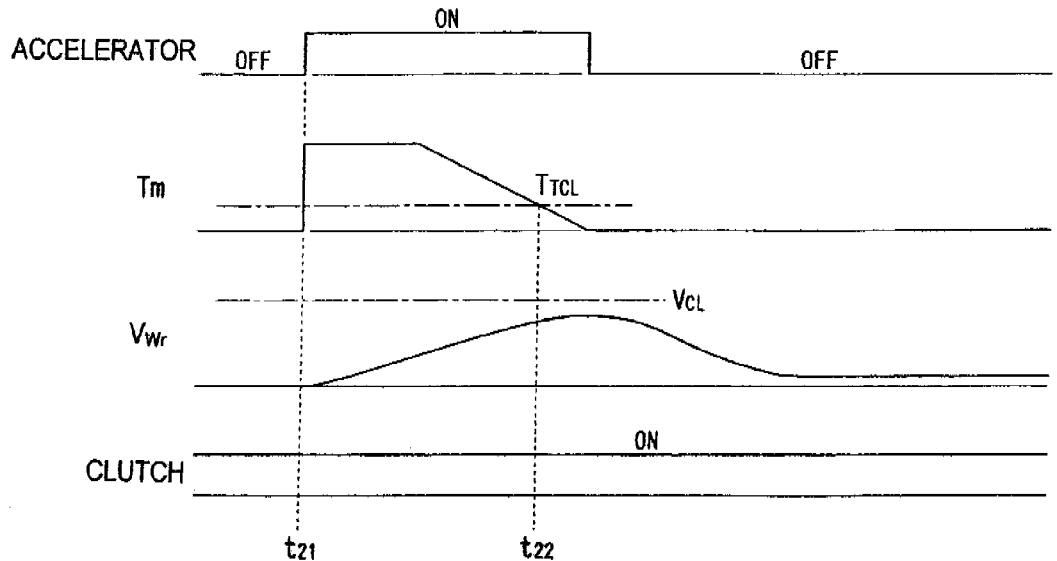
FIG. 12 is a timing chart illustrating the action of data processing executed by the clutch control section in FIG. 9.

FIGS. 10 to 12 are timing charts for illustrating the action of data processing executed by the clutch control section 8D as illustrated in FIG. 9. FIG. 10 shows a simulation in which the accelerator pedal 17 is depressed at a time $t_0$, from a stationary state in which the accelerator is off, the target motor torque Tm is zero, the average rear wheel speed $V_{Wr}$, which is equivalent to the travel speed of the auto vehicle, is also zero, and the clutch is on. This situation results in the target motor torque Tm rising to reach or surpass the motor torque prescribed value $T_{TCL}$, and the target motor torque Tm then gradually decreasing with a reduction in acceleration slippage, for example. The average rear wheel speed $V_{Wr}$ becomes greater than the low-speed prescribed value $V_{CL}$ at a time $t_{02}$ as the target motor torque Tm increases, but the clutch 12 continues to be engaged at this time because the target motor torque Tm is greater than the motor torque prescribed value $T_{TCL}$. The decreasing target motor torque Tm subsequently reaches a level at or below the motor torque prescribed value $T_{TCL}$ at time $t_{03}$, and the clutch 12 is therefore released subsequent to time $t_{03}$.

FIG. 11 shows a simulation in which the accelerator pedal 17 is depressed at a time $t_{11}$ from a stationary state in which the accelerator is off in the same manner, the target motor torque Tm is zero, the average rear wheel speed $V_{Wr}$, which is equivalent to the travel speed of the vehicle, is also zero, and the clutch 12 is on, with the result that the target motor torque Tm rises to reach or surpass the motor torque prescribed value $T_{TCL}$, and the target motor torque Tm then gradually decreases with a reduction in acceleration slippage, for example. The decreasing target motor torque Tm reaches a level at or below the motor torque prescribed value $T_{TCL}$ at a time $t_{12}$, but the clutch 12 maintains its engaged state because the average rear wheel speed $V_{Wr}$ is at or below the low-speed prescribed value $V_{CL}$ at this time. The travel speed then gradually increases, and the clutch is released and the motor rotational speed Nm decreases when the average rear wheel speed $V_{Wr}$ becomes greater than the low-speed prescribed value $V_{CL}$ at a time $t_{13}$.

Furthermore, FIG. 12 shows a simulation in which the accelerator pedal 17 is depressed at a time $t_{21}$ from a stationary state in which the accelerator is off in the same manner, the target motor torque Tm is zero, the average rear wheel speed $V_{Wr}$, which is equivalent to the travel speed of the vehicle, is also zero, and the clutch 12 is on, with the result that the target motor torque Tm rises to reach or surpass the motor torque prescribed value $T_{TCL}$, the target motor torque Tm then gradually decreases with, for example, a reduction in acceleration slippage, and the accelerator is then switched off. The switching off of the accelerator did not cause the average rear wheel speed $V_{Wr}$, which is equivalent to the travel speed of the vehicle, to become greater than the low-speed prescribed value $V_{CL}$. The decreasing target motor torque Tm reaches a level at or below the motor torque prescribed value $T_{TCL}$ at a time $t_{22}$, but the clutch maintains its engaged state because the average rear wheel speed $V_{Wr}$ is at or below the low-speed prescribed value $V_{CL}$ at this time. The clutch 12 continues maintaining its engaged state thereafter because the average rear wheel speed $V_{Wr}$ does not become greater than the low-speed prescribed value $V_{CL}$, and the vehicle continues traveling at a low speed under the creep torque of the internal combustion engine 2. Because the inertia from the clutch 12 to the electric motor 4 instantaneously disappears when the clutch 12 is released, the drive torque decreases and a shock is produced during low-speed travel, such as one observed during creep travel in particular. In the present embodiment, the clutch 12 is kept in an engaged state during low-speed travel even when the target motor torque Tm is equal to or less than the motor torque prescribed value $T_{TCL}$, making it possible, for example, to prevent shocks from accompanying clutch release during creep travel.

Second Embodiment

Referring now to FIGS. 12-15, a vehicle driving force control apparatus in accordance with a second embodiment will now be explained. In view of the similarity between the first and second embodiments, the parts or steps of the second embodiment that are identical to the parts or steps of the first embodiment will be given the same reference numerals as the parts or steps of the first embodiment. Moreover, the descriptions of the parts or steps of the second embodiment that are identical to the parts or steps of the first embodiment may be omitted for the sake of brevity.

The basic construction of this embodiment is the same as that of the first embodiment, except that the processing executed by the clutch control section 8D is different. Thus, the vehicle driving force control apparatus of this second embodiment of the present invention is installed in the four wheel drive vehicle that is diagrammatically illustrated in FIG. 1. Also, the 4WD controller 8 for the vehicle driving force control apparatus of this second embodiment is diagrammatically illustrated in FIGS. 2 and 3, as discussed above.

Figure 13:
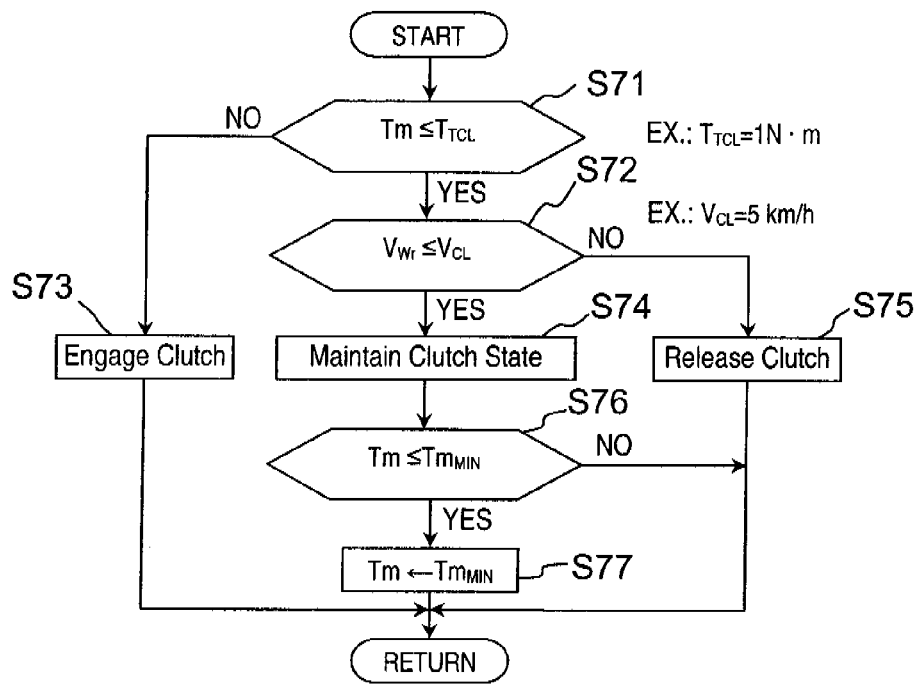
FIG. 13 is a diagram showing the processing executed by the clutch engagement control in accordance with a second embodiment based on the present invention.

In addition, all of the data processing performed in the 4WD controller 8, as discussed above, is the same as in the first embodiment, except for the data processing executed by the clutch control section 8D is conducted according to FIG. 13 instead of as in FIG. 9. Thus, the 4WD controller 8 for the vehicle driving force control apparatus of this second embodiment executes the processing sequence illustrated in FIGS. 3-8 in the same manner as discussed above with reference to the first embodiment. In other words, the processing sequence executed by the 4WD controller 8 of the second embodiment is generally shown in FIG. 3 as discussed above. The processing sequence executed by the surplus torque computing section 8E of the second embodiment is shown in FIG. 4 as discussed above. The processing sequence executed by the target torque limiting section 8F of the second embodiment is shown in FIG. 5 as discussed above. The processing sequence executed by the target torque limiting section 8G of the second embodiment is shown in FIG. 6 as discussed above.

Figure 8:
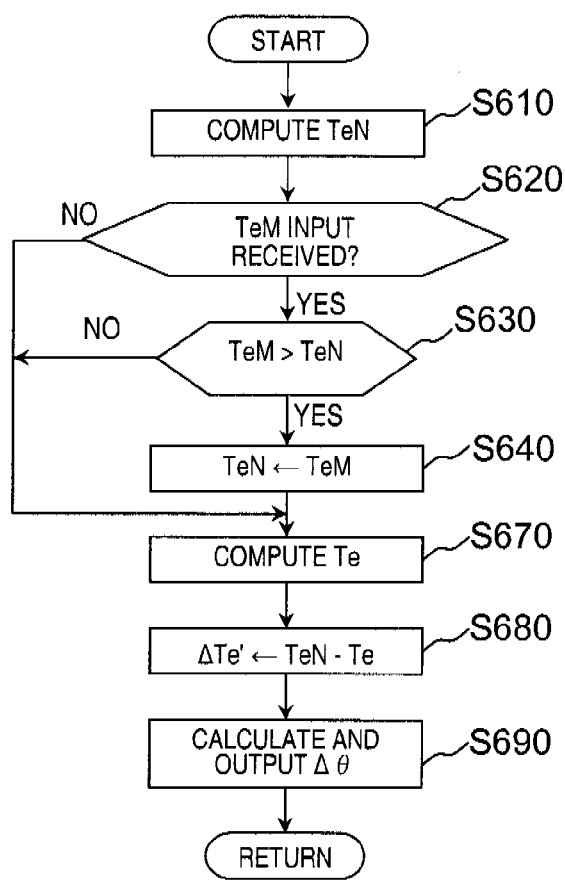
FIG. 8 is a flow chart showing the processing executed by the engine controller in accordance with the first embodiment based on the present invention.

The engine controller 18 for the vehicle driving force control apparatus of this second embodiment also executes the processing sequence illustrated in FIG. 8 as discussed above.

As mentioned above, in the present embodiment, the processing of data for the clutch engagement control performed by the clutch control section 8D is changed from the one shown in FIG. 9 to the one shown in FIG. 13. This type of data processing is similar to that in FIG. 9 and has equivalent steps. The equivalent steps are assigned the same symbols and are omitted from the detailed description. In the data processing shown in FIG. 13, steps S76 and S77 are added subsequent to step S74 of the data processing shown in FIG. 9.

In step S76, the 4WD controller 8 determines whether the target motor torque Tm is equal to or less than, for example, a motor torque minimum value $Tm_{MIN}$, which is equivalent to a motor torque that produces a vehicle speed that is at least equal to a creep vehicle speed resulting from a creep torque a creep torque of the internal combustion engine 2, and the system proceeds to step S77 if the target motor torque Tm is equal to or less than the motor torque minimum value $Tm_{MIN}$. Otherwise, the program of the clutch control section 8D returns to the main program if this is not the case.

Thus, the electric motor control section 8A is configured and arranged to control the electric motor 4 to drive the rear wheels 3L and 3R with the electric motor torque $Tm_{MIN}$ that produces a vehicle speed that is at least equal to the creep vehicle speed resulting from the creep torque of the internal combustion engine 2, when the clutch control section 8D maintains the engagement of the clutch 12.

Alternatively in step S76, the 4WD controller 8 determines whether the target motor torque Tm is equal to or less than, for example, a motor torque minimum value $Tm_{MIN}$, which is equivalent to a motor torque that produces a creep torque produced by the internal combustion engine 2 to drive the rear wheels 3L and 3R, when the clutch control section 8D maintains the engagement of the clutch 12. In other words, the process for determining electric motor torque $Tm_{MIN}$ is different in this alternative processing. In any event, in this alternative processing, the electric motor control section 8A is configured and arranged to control the electric motor 4 to drive the rear wheels 3L and 3R with the electric motor torque $Tm_{MIN}$ that is at least equal to a creep torque of the internal combustion engine 2, when the clutch control section 8D maintains the engagement of the clutch 12.

In step S77, the motor torque minimum value $Tm_{MIN}$ is set to the target motor torque Tm, and the system returns to the main program after the result is outputted to the motor control section 8C.

With this type of data processing, the clutch 12 is kept in the engaged state in addition to the action of data processing in FIG. 9 when the target motor torque Tm is equal to or less than the motor torque prescribed value $T_{TCL}$, and the average rear wheel speed $V_{Wr}$, which is equivalent to the travel speed of the auto vehicle, is equal to or less than the low-speed prescribed value $V_{CL}$. The target motor torque Tm is replaced with the motor torque minimum value $Tm_{MIN}$ when the target motor torque Tm becomes equal to or less than the motor torque minimum value $Tm_{MIN}$ at this time. Since the motor torque minimum value $Tm_{MIN}$ is equivalent to the creep torque provided by the internal combustion engine in the above-described manner, a drive torque equal to that of the left and right front wheels 1L and 1R, which are the main drive wheels, is applied by the electric motor to the left and right rear wheels 3L and 3R, which are the subordinate drive wheels.

Figure 14:
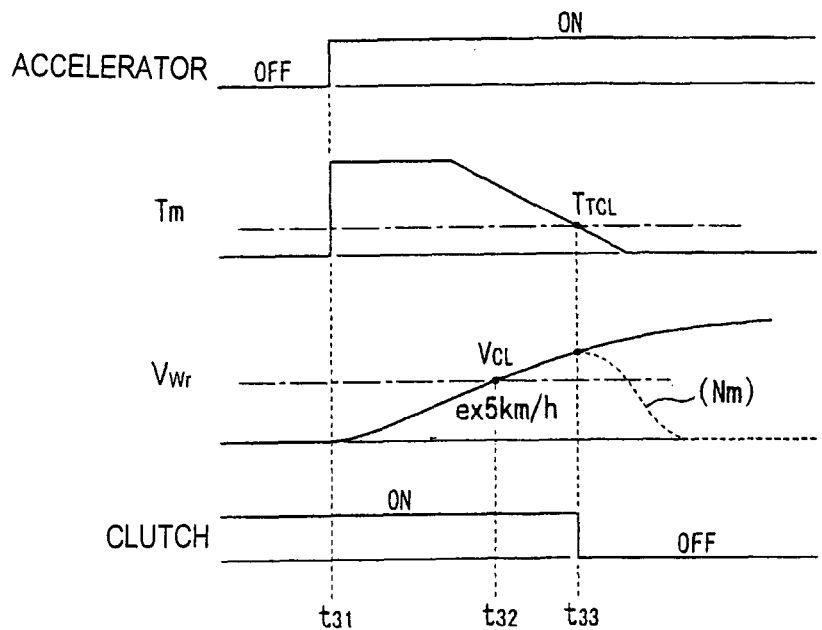
FIG. 14 is a timing chart illustrating the action of data processing executed by the clutch control section in FIG. 13.
Figure 15:
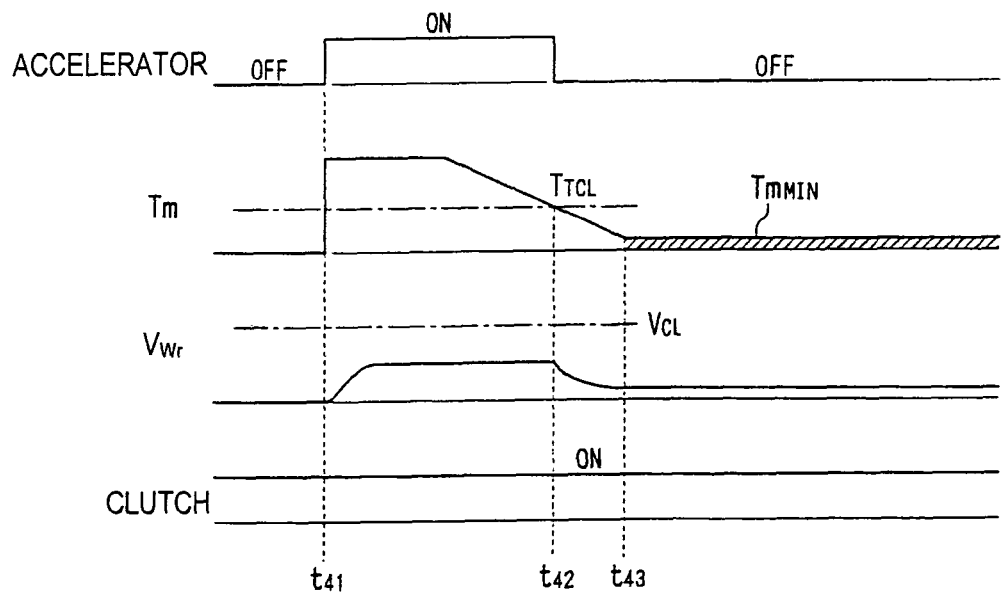
FIG. 15 is a timing chart illustrating the action of data processing executed by the clutch control section in FIG. 13.

FIGS. 14 and 15 are timing charts illustrating the action of data processing in FIG. 13. FIG. 14 shows a simulation in which the accelerator pedal 17 is depressed at a time $t_{31}$ from a stationary state in which the accelerator is off, the target motor torque Tm is zero, the average rear wheel speed $V_{Wr}$, which is equivalent to the travel speed of the vehicle, is also zero, and the clutch 12 is on, with the result that the target motor torque Tm rises to reach or surpass the motor torque prescribed value $T_{TCL}$, and the target motor torque Tm then gradually decreases with a reduction in acceleration slippage, for example. The average rear wheel speed $V_{Wr}$ becomes greater than the low-speed prescribed value $V_{CL}$ at a time $t_{32}$ as the target motor torque Tm increases, but the clutch continues to be engaged at this time because the target motor torque Tm is greater than the motor torque prescribed value $T_{TCL}$. The decreasing target motor torque Tm subsequently reaches a level at or below the motor torque prescribed value $T_{TCL}$ at a time $t_{33}$, and the clutch 12 is therefore released subsequent to a time $t_{33}$. Because the target motor torque Tm is not corrected after the clutch 12 is released, the target motor torque Tm becomes zero and the motor rotational speed Nm also becomes zero.

Furthermore, FIG. 15 shows a simulation in which the accelerator pedal 17 is depressed at a time $t_{41}$ from a stationary state in which the accelerator is off in the same manner, the target motor torque Tm is zero, the average rear wheel speed $V_{Wr}$, which is equivalent to the travel speed of the vehicle, is also zero, and the clutch 12 is on, with the result that the target motor torque Tm rises to reach or surpass the motor torque prescribed value $T_{TCL}$, the target motor torque Tm then gradually decreases with, for example, a reduction in acceleration slippage, and the accelerator is then switched off. The switching off of the accelerator did not cause the average rear wheel speed $V_{Wr}$, which is equivalent to the travel speed of the auto vehicle, to become greater than the low-speed prescribed value $V_{CL}$. The decreasing target motor torque Tm reaches a level at or below the motor torque prescribed value $T_{TCL}$ at time $t_{42}$, but the clutch 12 maintains its engaged state because the average rear wheel speed $V_{Wr}$ is at or below the low-speed prescribed value $V_{CL}$ at this time. The clutch 12 continues maintaining its engaged state thereafter because the average rear wheel speed $V_{Wr}$ does not become greater than the low-speed prescribed value $V_{CL}$, and the target motor torque Tm is subsequently kept at the motor torque minimum value $Tm_{MIN}$ if the target motor torque Tm becomes equal to or less than the motor torque minimum value $Tm_{MIN}$ at time $t_{43}$. Therefore, a drive torque that is equivalent to the creep torque developed by the internal combustion engine 2 continues to be applied by the electric motor 4 to the left and right rear wheels 3L and 3R, which are the subordinate drive wheels.

According to the present embodiment, the clutch 12 is kept in an engaged state during low-speed travel even when the target motor torque Tm is equal to or less than the motor torque prescribed value $T_{TCL}$, making it possible, for example, to prevent shocks from accompanying clutch release during creep travel in the same manner as in the first embodiment. In addition, the drive torque that is equivalent to a creep torque and is developed by the internal combustion engine 2 continues to be applied to the left and right rear wheels 3L and 3R, which are the subordinate drive wheels. The torque acts on the torque transfer path from the electric motor 4 to the rear wheels 3L and R; and the gaps present in the clutch 12, the reduction gear 11, the differential gear 3, and other mechanisms in the torque transfer path become closed. Consequently, the gaps are closed when, for example, the front wheels 1L and 2R are subsequently experiencing acceleration slippage and a transfer to a four-wheel drive state is made. As a result, not only is it possible to prevent shocks from being generated by the momentary closure of backlash or other type of looseness in the dynamic force transfer system, but the gaps in the dynamic force transfer system are also closed, making it possible to fully utilize the acceleration performance of a four-wheel drive because no shocks are generated even when there is a sudden increase in the drive torque created by the motor drive on the rear wheels 3L and 3R.

The above embodiments were described with reference to a case in which the electric motor 4 was driven by a voltage generated by the generator 7, and a four-wheel drive was configured, but this option is non-limiting. This approach is also applicable to a system comprising a battery capable of supplying electrical power to the electric motor.

Also, the above embodiments were described with reference to a case in which the electric motor 4 was driven by a voltage generated by the generator 7, but this option is non-limiting. For example, the present invention can be adapted to a vehicle configured such that the electric motor 4 is driven by a separate battery.

Furthermore, the above embodiments were described with reference to a four-wheel vehicle, but this approach is also applicable to a two-wheel vehicle in which the electric motor 4 is used as a drive source.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-255073. The entire disclosure of Japanese Patent Application No. 2002-255073 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle driving force control apparatus for a vehicle having a drive source configured to drive a first drive wheel, and a clutch disposed between the first drive wheel and the drive source, the vehicle driving force control apparatus comprising:
    a travel speed sensor configured to detect a travel speed of the vehicle; and
    a clutch engagement control section configured to control an engagement state of the clutch, the clutch engagement control section being further configured to maintain engagement of the clutch if the clutch is engaged and to maintain disengagement of the clutch if the clutch is disengaged when the travel speed of the vehicle is below a prescribed speed.

2. The vehicle driving force control apparatus as recited in claim 1, further comprising
    an electric motor control section configured to control an electric motor of the drive source to drive the first drive wheel such that the vehicle travels at a corresponding speed, when an accelerator of the vehicle is not operated and the clutch engagement control section maintains the engagement of the clutch.

3. The vehicle driving force control apparatus as recited in claim 1, further comprising
    an electric motor as part of the drive source is configured to selectively drive the first drive wheel through the electric motor; and
    an additional drive source is configured to selectively drive a second drive wheel independently of operation of the clutch between the electric motor and the first drive wheel.

4. The vehicle driving force control apparatus as recited in claim 3, wherein
    the additional drive source includes an internal combustion engine configured to drive the second drive wheel, and a generator driven by the internal combustion engine and configured to supply electrical power to the electric motor.

5. The vehicle driving force control apparatus as recited in claim 4, further comprising
    an acceleration slippage detection section configured to detect if acceleration slippage is occurring in the second drive wheel that is driven by the internal combustion engine; and
    a generator control section configured to control a generation load torque of the generator to substantially correspond to an acceleration slippage magnitude of the second drive wheel, when the acceleration slippage detection section estimates acceleration slippage occurring in the second drive wheel.

6. The vehicle driving force control apparatus as recited in claim 3, further comprising
    an electric motor control section configured to control the electric motor to drive the first drive wheel with an electric motor torque that produces a vehicle speed that is at least equal to a creep vehicle speed resulting from a creep torque of the additional drive source, when the clutch engagement control section maintains the engagement of the clutch.

7. The vehicle driving force control apparatus as recited in claim 3, further comprising
    an electric motor control section configured to control the electric motor to drive the first drive wheel with an electric motor torque that is at least equal to a creep torque produced by the additional drive source to drive the second drive wheel, when the clutch engagement control section is maintaining the engagement of the clutch.

8. The vehicle driving force control apparatus as recited in claim 3, wherein
    the clutch engagement control section is further configured to maintain the engagement of the clutch, when a motor torque of the electric motor is below a prescribed motor torque in which the clutch is released, when the travel speed of the vehicle is below a prescribed speed.

9. The vehicle driving force control apparatus as recited in claim 1, further comprising
    an acceleration slippage detection section configured to detect if acceleration slippage is occurring in a second drive wheel that is driven by a vehicle drive source independently of operation of the clutch; and
    a clutch control processing section configured to control the engagement of the clutch, based on a torque of the drive source when acceleration slippage is occurring in the second drive wheel.

10. The vehicle driving force control apparatus as recited in claim 9, further comprising
    an electric motor as part of the drive source is configured to selectively drive the first drive wheel through the electric motor; and
    an additional drive source is configured to selectively drive the second drive wheel independently of operation of the clutch between the electric motor and the first drive wheel.

11. The vehicle driving force control apparatus as recited in claim 10, wherein
    the additional drive source includes an internal combustion engine configured to drive the second drive wheel, and a generator driven by the internal combustion engine and configured to supply electrical power to the electric motor.

12. The vehicle driving force control apparatus as recited in claim 11, further comprising
    a generator control section configured to control a generation load torque of the generator to substantially correspond to an acceleration slippage magnitude of the second drive wheel, when the acceleration slippage detection section estimates acceleration slippage occurring in the second drive wheel.

13. A vehicle driving force control apparatus for a vehicle having a drive source configured to drive a first drive wheel, and a clutch disposed between the first drive wheel and the drive source, the vehicle driving force control apparatus comprising:
    travel speed sensing means for detecting a travel speed of the vehicle; and clutch engagement control means for controlling an engagement state of the clutch and for maintaining engagement of the clutch if the clutch is engaged and maintaining disengagement of the clutch if the clutch is disengaged when the travel speed of the vehicle is below a prescribed speed.

14. A method of controlling a vehicle comprising:

controlling disengagement of a clutch disposed between a drive source and a first drive wheel based on a clutch release command to disengage the clutch;

detecting a travel speed of the vehicle;

maintaining engagement of the clutch if the clutch is engaged when the travel speed of the vehicle is below a prescribed speed; and maintaining disengagement of the clutch if the clutch is disengaged when the travel speed of the vehicle is below the prescribed speed.

* * * * *